W. OTTO.
HIGH TENSION OSCILLATOR.
APPLICATION FILED JUNE 29, 1912.
1,103,822.
Patented July 14, 1914.
2 SHEETS—SHEET 1.
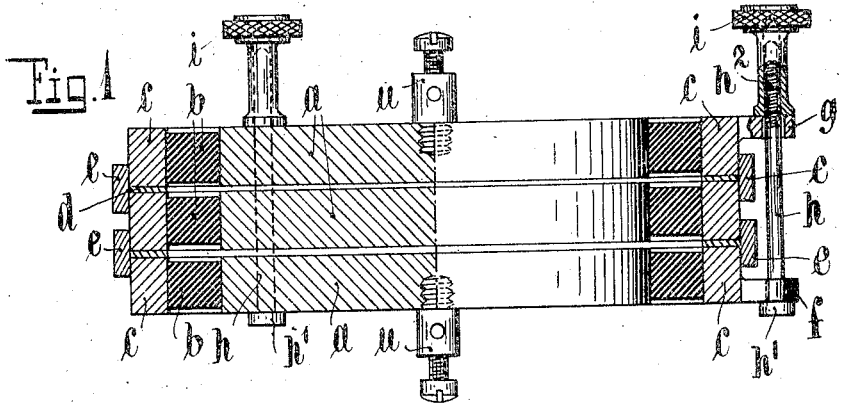
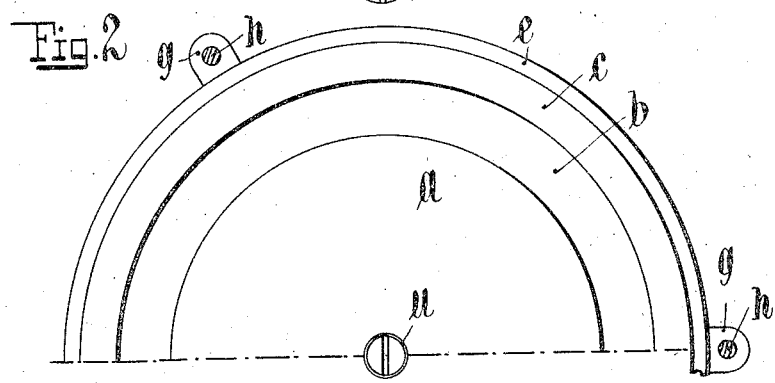
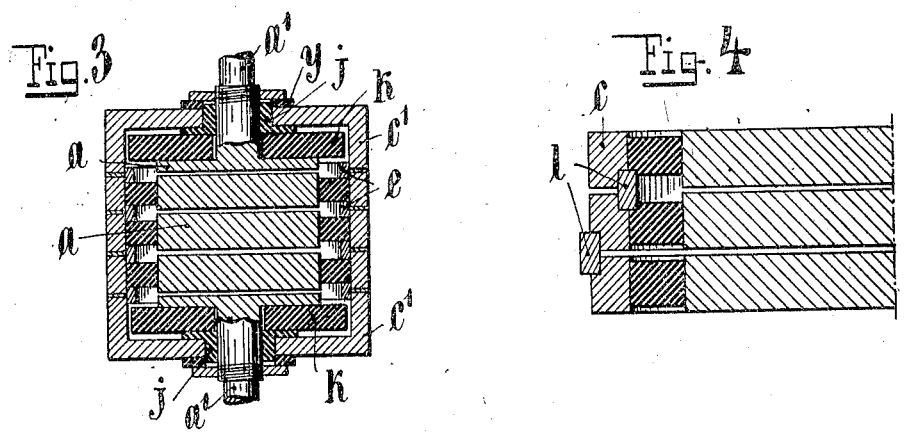
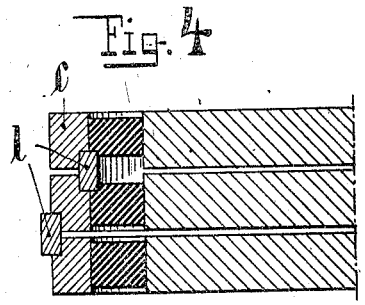

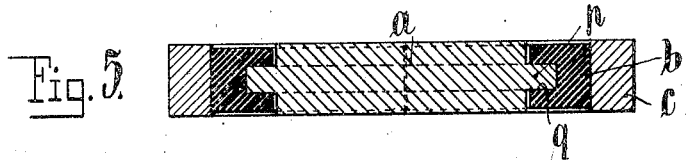
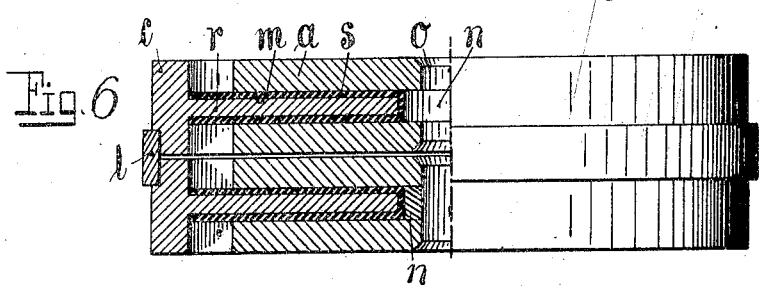

UNITED STATES PATENT OFFICE.

WERNER OTTO, OF BERLIN, GERMANY.

HIGH-TENSION OSCILLATOR.

1,103,822.  Specification of Letters Patent.  Patented July 14, 1914.

Application filed June 29, 1912. Serial No. 706,723.

*To all whom it may concern:*

Be it known that I, WERNER OTTO, engineer, a subject of the Grand Duke of Mecklenburg, residing at Berlin, Germany, have invented certain new and useful Improvements in High-Tension Oscillators; and I do hereby declare the following to be a full, clear, and exact description of the invention, such as will enable others skilled in the art to which it appertains to make and use the same.

This invention relates to single or multiple inclosed high-tension electric oscillators of the type in which the space between neighboring electrodes is unoccupied by any solid insulating medium.

Oscillators according to the present invention comprise a casing containing electrode plates having substantially parallel opposing surfaces and insulating means arranged directly between said casing and said plates, suitable means being employed to maintain the plates at a suitable distance apart.

The invention also comprises the particular combinations hereinafter described and claimed.

In the accompanying drawing several constructional forms of the present invention are exemplified.

Figure 1 is a vertical section through an arrangement, in which all electrodes are made of the same type, each being arranged in a cylindrical ring of a corresponding axial dimension. Fig. 2 is a plan view of Fig. 1, showing only one half of same. Fig. 3 is an oscillator in which the terminal electrodes are connected to sections of a casing which consist each of a cylindrical portion and a flat end portion. Figs. 4 to 6 show further constructional forms both in the general arrangement and the details.

With the oscillator according to Figs. 1 and 2 each electrode plate $a$ is secured in a ring $c$, an insulating ring $b$, made for instance of porcelain, being placed between them. The ring $c$ is made, the same as the electrode plate, of preferably a good heat-conductor, say copper. The axial dimension of the ring $c$ corresponds to the thickness of the electrode plate $a$. An accurate equality of these dimensions may be easily obtained, by rigidly combining the electrode plate with the insulating ring and the ring $c$, and then grinding down or otherwise machining the plate $a$ and the ring $c$ together. The insulating ring $b$ is joined to the ring $c$ and the plate $a$ by aid of a suitable medium, for instance a cement.

When several electrodes are combined in an oscillator, packing and distance-rings $d$ which are preferably of metal are placed between the rings $c$ attached to the individual electrode plates. The thickness of these rings $d$ will then determine the distance between the individual electrodes $a$, as the axial dimensions of the rings $c$ and the plates $a$ are equal, as has been hereinbefore said.

For the several elements consisting each of a plate $a$, an insulating ring $b$ and an outer ring $c$ to adjust themselves absolutely co-axially, centering rings $e$ may, as shown in Figs. 1 and 2 be slipped over the shell formed by the several rings $c$, so that each ring $e$ will overlap the adverse ends of two neighboring rings $c$.

The end electrode plates are furthermore fitted with pole binding posts $u$ by means of which the oscillator is connected to an electric circuit. In the drawing it has been assumed, that the whole oscillator consists of the two end elements the electrode plates of which are fitted with pole binding posts $u$ and a single intermediate element. Of course any number of intermediate elements may be employed and the oscillator may also be made of only two elements with pole binding posts without any intermediate elements, so that a single oscillator is obtained.

According to Figs. 1 and 2 means are further provided for rigidly connecting the individual oscillator elements with each other in an axial direction. For this purpose the rings $c$ holding the end-electrodes have outwardly projecting lugs $f$, $g$. Through bores in these lugs are passed bolts $h$, having a head $h^1$ at one end, and a thread $h^2$ at the other. By means of nuts $i$ the screw-bolts $h$ can be tightened and thereby the several elements may be axially pressed together. In some cases the above described tightening arrangement is dispensable, as it may be sufficient to loosely superpose the several elements.

With the arrangement according to Fig. 3 the several elements of the oscillator are centered with regard to each other by means of centering rings $e$ arranged on the inside of the rings $c$. Here the end-electrodes are not secured to rings of the same axial dimension, like the central electrodes, but to a section of the casing composed of a cylindrical portion and a flat end portion. Of course the end-electrodes, from which connection bolts $a^1$ lead axially outward for allowing of connecting the feeder cables, are insulated from their casing-sections by means of suitable insulating parts $j$, $k$, $y$. Thus an oscillator is obtained, the electrodes of which are completely inclosed in a metallic casing formed independently of them, while with the arrangement according to Figs. 1 and 2 the end-electrodes themselves together with their insulating rings form the ends of the casing. Also with this constructional form it is possible to obtain a single oscillator by omitting the intermediate electrodes, in which case the casing-sections of the two end-electrodes alone will form the casing.

With the constructional form according to Fig. 4 rings $l$ are arranged between the rings $c$, serving at the same time as guide and distance rings. The rings $l$ are of a considerably greater axial dimension than the distance of the electrodes required. The rings $c$ are correspondingly recessed and the rings $l$ fit into these recesses. This arrangement has the advantage, that in consequence of the greater axial dimension of the rings $l$ the working of them is facilitated.

In the construction of an oscillator element shown in Fig. 5 the electrode plate $a$ has at its edge a projecting web $p$ which engages in a groove $q$ in the split ring $b$.

With the arrangement according to Fig. 6 each electrode $a$ is provided with an annular groove $m$ in its circumference, which groove is engaged by an inwardly projecting web $r$ of the metallic ring $c$. The electrode consists of two plates, between which a distance-disk $n$ has been arranged, and which are held together by means of a rivet $o$. Between the web $r$ and the electrode is arranged a layer of insulating material $s$, which extends up to the ring $c$. As insulating material for this purpose mica or any other suitable material may be employed.

I claim:

1. An inclosed high-tension oscillator having electrode plates standing freely opposite each other with substantially parallel opposing surfaces, a casing formed of sections corresponding to the single electrode plates, and insulating parts arranged between said electrode plates and casing sections and directly supporting said electrode-plates.

2. An inclosed high-tension oscillator having electrode plates standing freely opposite each other, a casing formed of sections corresponding to the single electrode plates, and insulating rings arranged directly between said electrode plates and casing sections and supporting said electrode plates.

3. An inclosed high-tension oscillator having electrodes standing freely opposite each other, a casing formed of corresponding sections, insulating parts arranged between said electrodes and casing sections and supporting said electrodes, the electrodes and casing sections having the same axial dimension, and distance rings interposed between the neighboring casing sections.

4. An inclosed high-tension oscillator having electrodes standing freely opposite each other, a casing formed of corresponding sections, insulating rings arranged between said electrodes and casing sections and supporting said electrodes, the electrodes and casing sections having the same axial dimension, and distance rings interposed between the neighboring casing sections.

5. An inclosed high-tension oscillator having electrodes standing freely opposite each other, a casing formed of corresponding sections, insulating parts arranged between said electrodes and casing sections and supporting said electrodes, and centering rings engaging the adjacent ends of neighboring casing sections.

6. An inclosed high-tension oscillator having electrodes standing freely opposite each other, a casing formed of corresponding sections, insulating rings arranged between said electrodes and casing sections and supporting said electrodes, and centering rings engaging the adjacent ends of neighboring casing sections.

7. An inclosed high-tension oscillator having electrodes standing freely opposite each other, a casing formed of corresponding sections, insulating parts arranged between said electrodes and casing sections and supporting said electrodes, the electrodes and casing sections having the same axial dimension, annular recesses in the ends of said casing sections, and centering and distance rings engaging said recesses.

8. An inclosed high-tension oscillator having electrodes standing freely opposite each other, a casing formed of corresponding sections, insulating rings arranged between said electrodes and casing sections and supporting said electrodes, the electrodes and distance rings having the same axial dimensions, annular recesses in the ends of said casing sections, and centering and distance rings engaging said recesses.

9. An inclosed high-tension oscillator having electrode plates standing freely opposite each other, a casing formed of corresponding sections, insulating parts directly arranged between said electrode plates and casing sections and supporting said electrode plates, and means to clamp together the several casing sections.

10. An inclosed high-tension oscillator having electrode plates standing freely opposite each other, a casing formed of corresponding sections, insulating rings directly arranged between said electrode plates and casing sections and supporting said electrode plates, and means to clamp together the several casing sections.

5. 11. An inclosed high-tension oscillator element comprising an electrode, a casing section having the same axial dimension, and an insulating ring interposed between and connecting together said electrode and casing section.

In testimony whereof, I affix my signature, in presence of two witnesses.

WERNER OTTO.

Witnesses:
 AUGUST TRAUTMANN,
 HENRY HASPER.